United States Patent [19]
Moriarty

[11] 4,071,040
[45] Jan. 31, 1978

[54] WATER-PROOF AIR-PRESSURE EQUALIZING VALVE

[75] Inventor: Lawrence James Moriarty, Galion, Ohio

[73] Assignee: North Electric Company, Galion, Ohio

[21] Appl. No.: 667,895

[22] Filed: Mar. 18, 1976

[51] Int. Cl.² .............................................. H04M 1/03
[52] U.S. Cl. ..................................... 137/199; 55/524; 179/179; 174/16 R
[58] Field of Search ................... 137/199, 197; 55/524; 210/510; 179/179; 220/374; 174/16 R, 14 R; 98/1

[56] References Cited

U.S. PATENT DOCUMENTS

| | | | |
|---|---|---|---|
| 3,033,911 | 5/1962 | Duddy | 137/197 X |
| 3,229,023 | 1/1966 | Bolton | 174/14 R |
| 3,326,230 | 6/1967 | Frank | 137/199 |
| 3,694,566 | 9/1972 | Thompson | 174/16 R |
| 3,719,197 | 3/1973 | Pannier | 137/199 X |

*Primary Examiner*—Alan Cohan
*Attorney, Agent, or Firm*—Charles M. Hutchins

[57] ABSTRACT

A water-proof air-pressure equalizing valve for an enclosure capable of being pressurized to match a wide range of ambient air pressures including that corresponding to the pressure of several feet of water when totally submerged, such as the instrument housing of a military-type field telephone set, comprises a sandwich structure having a thin air-permeable hydrophobic membrane clamped between two rigid perforated sheets providing mechanical support against deformation due to water or air pressure.

2 Claims, 3 Drawing Figures

U.S. Patent
Jan. 31, 1978
4,071,040
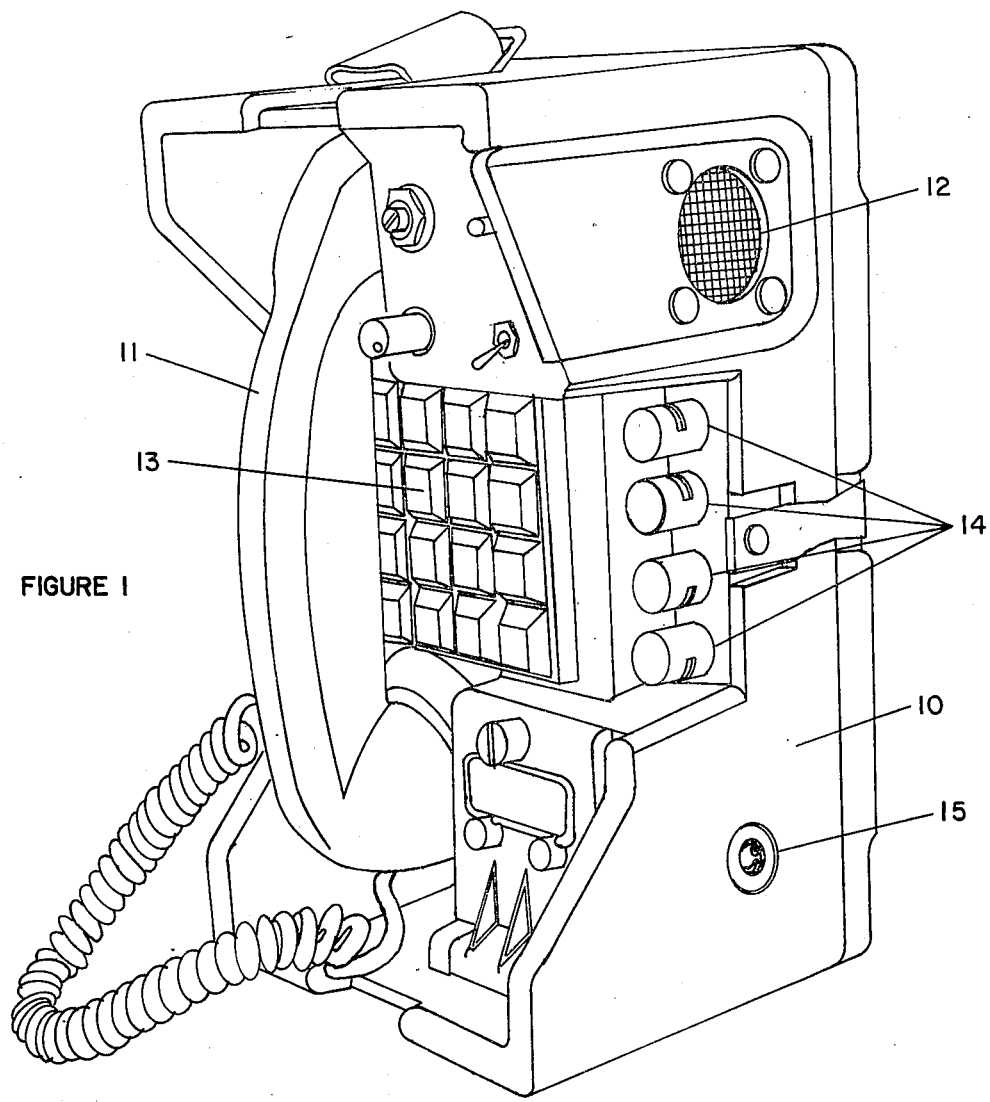
FIGURE 1
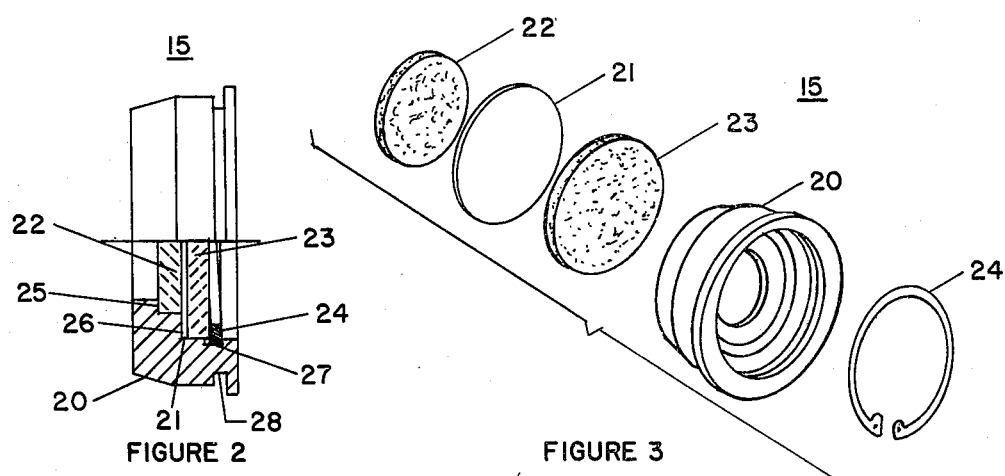
FIGURE 2
FIGURE 3

WATER-PROOF AIR-PRESSURE EQUALIZING VALVE

BACKGROUND AND FIELD OF THE INVENTION

The invention described herein was made in the course of a defense contract with the United States Government.

Certain military-type telephone handsets designed for field use must meet very stringent temperature and pressure requirements. For example, one such telephone station set must operate satisfactorily, or be capable of being transported without damage, over a wide range of ambient air pressures ranging from that corresponding to sea level up to a high altitude, for example 50,000 feet. The air pressure inside and outside the instrument casing must be substantially equalized over this entire range of pressures. In addition, it must be capable of being submerged in water to a depth of 6 feet without entry of water and damage to the electronic components and other elements within the instrument casing.

In order to meet these pressurization requirements, some means must be provided to facilitate a substantially unimpeded flow of air through an aperture communicating from the outside to the inside of the instrument casing, while still preventing water under pressure from entering the inside of the casing when it is submerged.

SUMMARY OF THE INVENTION

The present invention provides a novel air pressure relief valve which may readily be installed in the wall of an instrument casing, such as the housing of a military-type telephone station set, which permits a substantially unimpeded flow of air into or out of the casing while at the same time sealing the casing against entry of water even though the instrument may be submerged to a depth of several feet.

The water-proof air-pressure equalization valve of my invention is inexpensive, rugged, contains no moving parts and is also completely automatic in operation. The active element comprises a thin film or membrane having a large number of microscopic holes, each of the order of one micron in diameter. The film or membrane is also treated to render it water-repellent, i.e., hydrophobic. To prevent deformation or rupture of the membrane, it is sandwiched between two rigid discs or sheets having a much coarser porous structure. In a preferred embodiment of my invention, these rigid discs or sheets may be made of sintered stainless steel. This three-part sandwich is then mounted in the valve so as to extend completely across an aperture in the valve housing and is clamped and sealed in place by suitable means.

BRIEF DESCRIPTION OF THE DRAWINGS

FIG. 1 is a perspective view in outline form of a military-type field telephone station set which may incorporate one or more of the water-proof air-pressure equalization valves of the present invention;

FIG. 2 is a side elevation view, partly in section, showing a preferred construction of the release valve of the present invention; and FIG. 3 is an exploded perspective view of elements of the release valve of FIG. 2.

DETAILED DESCRIPTION

FIG. 1 shows, in an outline perspective view, a field telephone station set used by the military and in which may invention has particular utility. It comprises a molded instrument casing or housing 10 and a telephone handset 11 which hangs on a hook switch, not visible, when not in use. The instrument has a ringing microphone behind a grille 12, a keyset assembly 13 of sixteen pushbuttons for touch dialing, and four binding posts 14 for connection to field telephone circuits. The keyset 13 is preferably molded in a single piece of silicone rubber so that dirt and water cannot enter the casing around the pushbuttons. These details form no part of my present invention and are shown for illustrative purposes only. The important objective is that all internal electrical and electronic components of the station set be sealed within the enclosure 10 and that air flow can take place only through a pressure-relief valve, now to be described.

Stringent military specifications require the air pressure within the enclosure to be equalized with the ambient air pressure over a wide range of altitudes and, as previously mentioned, the particular instrument illustrated must be capable of withstanding submersion in six feet of water without entry of water into the instrument. In accordance with my invention, this is accomplished by the pressure release valve 15 in one side of the casing 10. Its structure is shown in greater detail in FIGS. 2 and 3, to which reference should now be made.

In the partially-sectioned side-elevation view of FIG. 2, all elements of the release valve are shown in assembled position and the individual elements are shown in the expanded perspective view of FIG. 3. In the illustrative embodiment, it consists of an annular housing 20, a thin microporous membrane 21 sandwiched between sintered stainless steel discs 22 and 23, and a bowed retaining snap ring or C-ring 24.

Disc 22 is preferably of slightly smaller diameter than membrane 21 and disc 23, and retains the assembly against leftward movement by bearing against a shoulder 25 in the housing 20, as shown in FIG. 2. Membrane 21 seats against a similar shoulder 26 in order to provide a good annular seal with respect to the housing 20. Finally, disc 23 is pressed against the membrane 21 by means of the slightly-bowed C-ring 23 which snaps into an annular groove 27 in housing 20.

In accordance with my invention, the thin membrane 21 has a microporous construction similar to that used for filtering in biological laboratory work. A number of such materials are commercially available. One material which I found suitable for this purpose is a polycarbonate sheet known commercially as "Hydrophobic Nuclepore Membrane", available from Nuclepore Corporation, 7035 Commerce Circle, Pleasanton, California 94566. This particular material is treated to provide a very large number of holes, each of about one micron diameter, and is also treated to prevent the passage of water therethrough.

Since the membrane 21 may have a thickness that is only of the order of 0.0004 inches, it requires mechanical support. This is provided by the much thicker rigid discs 22 and 23 on each side of it. These discs may have a much coarser porous structure, the main requirements being that they permit relatively free passage of both air and water therethrough, that they be mechanically strong and rigid and that they be corrosion resistant. There are a number of commercially-available materials which are suitable for this purpose. In one embodiment of my invention, I found a satisfactory material to be a sintered corrosion-resistant steel known commercially as Type 316, available from Sintered Specialties of Janesville, Wisconsin.

In the exploded perspective view of FIG. 3, the elements are assembled as follows: the sintered disc 22 is first seated in the casing 20, next the membrane 21, and then the larger sintered disc 23. These three elements are then retained in place by the snap-ring 24.

The pressure relief valve 15 is mounted in any suitable manner in one wall of the instrument casing 10, for example as illustrated in FIG. 1. As seen in FIG. 2, it may have a shoulder and flange defining a groove 28 so it may be snapped into a hole in the casing 10 to provide a good mechanical seal. If necessary, more than one such valve may be used to communicate between the interior of the instrument and the exterior environment. In a physical embodiment of the telephone station set shown in FIG. 1, the handset 11 was also provided with a similar pressure-equalizing release valve (not illustrated).

It will thus be seen that I have provided an air-pressure release valve which is operable over a very wide range of ambient conditions, which can withstand a substantial water pressure without passage of liquid therethrough, which is entirely automatic and which requires no moving parts. While I have described what is regarded as a preferred embodiment of the invention, it will be apparent that variations, rearrangements and modifications may be made therein without departing from the scope of the present invention as defined by the appended claims.

I claim:
1. A gaseous relief valve for an enclosure containing delicate electronic communication equipment which must be pressurized over a range of gas pressures and protected against immersion in a liquid comprising:
 a. a housing for said equipment defining an aperture,
 b. a first sheet of thin, gas-permeable, liquid-repellent material incapable of withstanding substantial liquid pressure without deformation or rupture;
 c. second and third sheets of a mechanically-rigid gas-permeable material disposed on opposite sides of said first sheet, said second and third sheets each having one surface in physical contact with an adjoining surface of said first sheet over substantially the entire surface area thereof, thereby forming a mechanically-rigid sandwich without voids between adjoining surfaces of said sheets; and
 d. sealing means for retaining said three sheets in a fixed position across said aperture.

2. In a telephone station set or the like having a sealed hollow enclosure which must withstand immersion in several feet of water without adverse effect on apparatus contained within said enclosure, an air-pressure relief valve communicating between the interior of said enclosure and the exterior environment comprising in combination:
 a. a housing for said valve extending through a wall of said enclosure and defining an aperture therethrough;
 b. a pair of rigid, porous, corrosion-resistant discs extending across said aperture;
 c. a thin, flexible membrane of air-permeable hydrophobic material interposed between said discs, said membrane being incapable of withstanding substantial water pressure without deformation or rupture, said membrane being in physical contact with each of said discs over substantially the entire adjoining surface area of said membrane;
 d. said discs and interposed membrane forming a rigid sandwich structure without voids between adjoining surfaces of said membrane and said discs which is capable of withstanding substantial water pressure without deformation or rupture of said membrane while permitting passage of air therethrough;
 e. means providing a water-tight seal between the edges of said discs and the inner wall of said housing; and
 f. resilient clamping means for retaining said sandwich structure within said housing across said aperture.

* * * * *